(12) United States Patent
Nakamura et al.

(10) Patent No.: US 7,535,736 B2
(45) Date of Patent: May 19, 2009

(54) SWITCHING POWER SUPPLY FOR REDUCING EXTERNAL PARTS FOR OVERCURRENT PROTECTION

(75) Inventors: Masaru Nakamura, Saitama (JP); Masaaki Shimada, Fujimi (JP)

(73) Assignee: Sanken Electric Co., Ltd., Saitama-ken (JP)

( * ) Notice: Subject to any disclaimer, the term of this patent is extended or adjusted under 35 U.S.C. 154(b) by 147 days.

(21) Appl. No.: 11/763,474

(22) Filed: Jun. 15, 2007

(65) Prior Publication Data
US 2007/0291516 A1 Dec. 20, 2007

(30) Foreign Application Priority Data
Jun. 20, 2006 (JP) ............................. 2006-169830

(51) Int. Cl.
*H02M 3/335* (2006.01)
*H02H 7/122* (2006.01)
(52) U.S. Cl. ................. 363/21.16; 363/21.15; 363/56.1
(58) Field of Classification Search ................... 363/15, 363/16, 20, 21.01, 21.07, 21.08, 21.09, 21.1, 363/21.11, 21.12, 21.15, 21.16, 21.17, 21.18, 363/55, 56.01, 56.09, 56.1, 97, 131
See application file for complete search history.

(56) References Cited

U.S. PATENT DOCUMENTS

| | | | | |
|---|---|---|---|---|
| 6,078,510 A * | 6/2000 | Spampinato et al. | ...... | 363/21.13 |
| 7,239,532 B1 * | 7/2007 | Hsu et al. | ................ | 363/21.12 |
| 7,394,670 B2 * | 7/2008 | Koike | ...................... | 363/21.16 |
| 7,414,865 B2 * | 8/2008 | Yang | ....................... | 363/21.16 |

* cited by examiner

*Primary Examiner*—Gary L Laxton
(74) *Attorney, Agent, or Firm*—Wood, Herron & Evans, LLP (57) ABSTRACT

A switching power supply has a switching device connected via a primary winding of a transformer to DC input voltage; a circuit for rectifying voltage at a secondary winding of the transformer, and outputting an output signal; and a control circuit for controlling on/off states of the switching device. The control circuit detects a current signal generated based on a forward voltage generated at a drive winding of the transformer while the switching device is on; generates an input correction signal using the current signal, the level of the input correction signal varying in accordance with the DC input voltage; detects a signal of current flowing through the switching device; and compares the input correction signal with the signal of the current flowing through the switching device, and limits the maximum value of this current in accordance with the DC input voltage.

8 Claims, 5 Drawing Sheets

SWITCHING POWER SUPPLY FOR REDUCING EXTERNAL PARTS FOR OVERCURRENT PROTECTION

BACKGROUND OF THE INVENTION

1. Field of the Invention

The present invention relates to a switching power supply, in particular, for reducing external parts for a control IC (i.e., a semiconductor integrated circuit) and manufacturing cost, and realizing downsizing.

Priority is claimed on Japanese Patent Application No. 2006-169830, filed Jun. 20, 2006, the content of which is incorporated herein by reference.

2. Description of the Related Art

Figure 5:
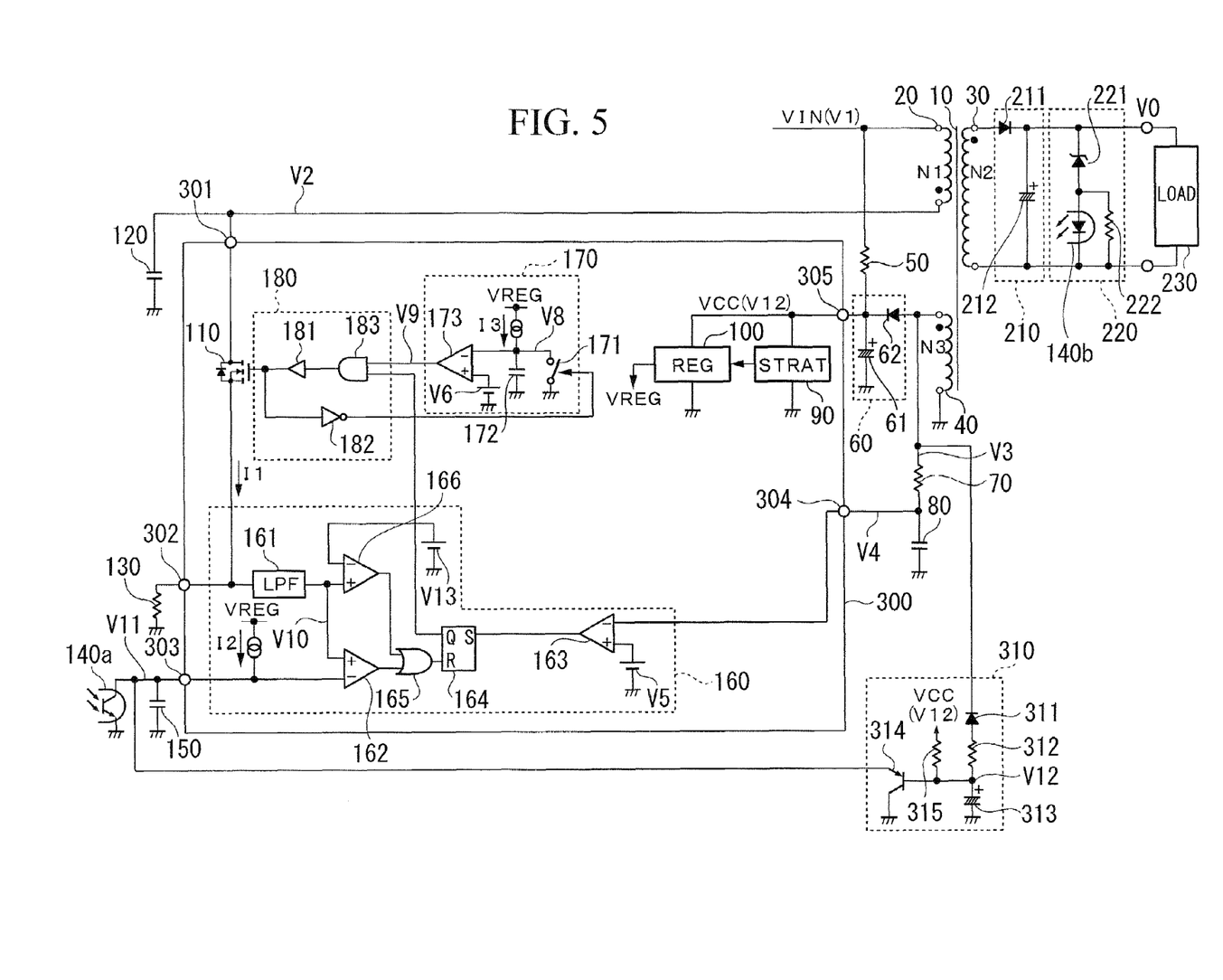
FIG. 5 is a diagram showing the structure of a conventional switching power supply.

FIG. 5 shows an example of a known voltage-pseudo-resonance switching power supply. In a method for reducing dependency of an overcurrent protection circuit in this type of switching power supply on DC (direct current) input voltage, when a switching device 110 is on, pulse-formed negative voltage V3 (i.e., forward voltage) is detected, which is generated at a drive winding 40 and is in proportion to DC input voltage V1 (see, for example, part (c) in FIG. 2). Based on the detected signal, DC input voltage correction for overcurrent protection is performed. Below, the relevant structure and operation will be explained with reference to the switching power supply shown in FIG. 5.

In FIG. 5, the primary control circuit includes a primary winding 20 of a transformer 10, which is connected to a DC input voltage V1; the drive winding 40; an activation resistor 50; a rectification smoothing circuit 60; a bottom control resistor 70; a bottom control capacitor 80; a start circuit ("START") 90 for starting the operation; a constant voltage source ("REG") 100; the switching device 110; a resonance capacitor 120 with respect to the primary winding 20; a drain-current detection resistor 130; a light receiving element 140a of a photocoupler; a phase control capacitor 150; a pseudo-resonance control circuit 160; a maximum on-width generation circuit 170; an output-stage circuit 180; and an input correction circuit 310.

The secondary circuit of the transformer 10 includes a secondary winding 30; a rectification smoothing circuit 210; an error amplification circuit 220; and a load 230.

The rectification smoothing circuit 210 rectifies and smoothes voltage, which is induced at the secondary winding 30 during the off-period of the switching device 110, by using a rectifying diode 211 and a smoothing capacitor 212.

The error amplification circuit 220 consists of a Zener diode 221, a resistor 222, and a light emitting element 140b of the photocoupler. An error signal of output voltage Vo on the secondary side with respect to reference voltage is fed back to the primary side via the light emitting element 140b and the light receiving element 140a of the photocoupler.

The switching device 110, the pseudo-resonance control circuit 160, the maximum on-width generation circuit 170, the output-stage circuit 180, and the like, are contained in a single control IC 300 (i.e., semiconductor integrated circuit) which is a constituent of the control circuit in the switching power supply.

After the switching device 110 is switched off and a specific flyback period is terminated, the pseudo-resonance control circuit 160 compares a voltage signal V4 with reference voltage V5 by using a bottom detection comparator 163, where the voltage signal V4 is obtained by shaping the (free oscillation) voltage V3 generated at the drive winding 40 by means of bottom control devices (i.e., the bottom control resistor 70 and the bottom control capacitor 80). When the voltage signal V4 falls below the reference voltage V5, it is determined that the free oscillation has reached its bottom, and an on-trigger signal having a Hi (i.e., high) level is output to the set terminal S of an SR flip-flop 164, thereby switching on the switching device 110.

While the switching device 110 is on, drain current I1 is converted into a voltage signal by the drain-current detection resistor 130, and an overcurrent detection signal V10, which has been shaped by a low-pass filter (LPF) 161, is compared with feedback voltage V11 supplied by the error amplification circuit 220 on the secondary side, by means of a feedback control comparator 162. When the overcurrent detection signal V10 has exceeded the feedback voltage V11, an off-trigger signal of Hi level is output to the reset terminal R of the SR flip-flop 164, thereby switching off the switching device 110.

An overcurrent detection comparator 166 is provided for determining an overcurrent state when the overcurrent detection signal V10 has exceeded reference voltage V13, and forcibly switching off the switching device 110 so as to protect it.

The maximum on-width generation circuit 170 is provided for preventing the on-width of the switching device 110 (i.e., a temporal width during which the switching device is on) from being excessively widened, when low voltage is input or the power is turned off.

While the switching device 110 is on, the input correction circuit 310 rectifies and smoothes the forward voltage V3, which is generated at the drive winding 40, via a diode 311, a resistor 312, and a capacitor 313. The rectified and smoothed signal is input (as the reference voltage) into the base of a PNP transistor 314 for clamping the feedback voltage V11. That is, control is performed in a manner such that the higher the DC input voltage V1, the lower the clamped feedback voltage (V11), thereby realizing overcurrent protection having small dependency on the DC input voltage.

In the conventional switching power supply shown in FIG. 5, the diode 311, the resistors 312 and 315, the capacitor 313, the PNP transistor 314, and the like, which are necessary for implementing the input correction circuit 310, are external parts of the control IC 300. In order to reduce the manufacturing cost and realize downsizing, removal of such external parts has been desired.

SUMMARY OF THE INVENTION

In light of the above circumstances, an object of the present invention is to provide a switching power supply by which (i) external parts, which are conventionally necessary for performing the DC input voltage correction for overcurrent protection, can be reduced, and (ii) manufacturing-cost reduction and downsizing of the switching power supply can be realized, and which also contributes to downsizing of the package for the control IC.

Therefore, the present invention provides a switching power supply comprising:

a switching device connected via a primary winding of a transformer to DC input voltage;

a rectification smoothing circuit for rectifying voltage which is induced at a secondary winding of the transformer, and outputting an output signal; and a control circuit which controls on/off states of the switching device and includes:

a current signal detection circuit for detecting a current signal generated based on a forward voltage which is generated at a drive winding of the transformer while the switching device is on;

an input correction circuit for generating an input correction signal using the current signal which is generated based on the forward voltage, wherein the level of the input correction signal varies in accordance with the level of the DC input voltage;

a switching device current detection circuit for detecting a signal of current which flows through the switching device; and an overcurrent detection circuit for comparing the input correction signal with the signal of the current flowing through the switching device, and limiting the maximum value of the current flowing through the switching device in accordance with the DC input voltage.

In this structure, the forward voltage induced at the drive winding during the on-period of the switching device is converted into a current signal, whose level is in proportion to the DC input voltage. Thus, based on the current signal, an input correction signal can be generated, whose level varies in accordance with the level of the DC input voltage. The input correction signal is compared with the signal of the current flowing through the switching device (i.e., the current which increases (with a gradient) during the on-period thereof). When the signal of the current flowing through the switching device has exceeded the level of the input correction signal, the switching device is switched off. That is, the maximum value limitation is performed in a manner such that the higher the DC input voltage, the lower the peak value of the current flowing through the switching device.

Accordingly, it is possible to perform the DC input voltage correction for the overcurrent protection, based on the current signal generated based on the forward voltage. Therefore, external parts (which are necessary in the conventional power supply) can be reduced, thereby reducing the manufacturing cost of the switching power supply and realizing downsizing thereof.

The present invention also provides a switching power supply comprising:

a switching device connected via a primary winding of a transformer to DC input voltage;

a rectification smoothing circuit for rectifying voltage which is induced at a secondary winding of the transformer, and outputting an output signal; and a control circuit which controls on/off states of the switching device and includes:

a current signal detection circuit for detecting a current signal generated based on a forward voltage which is generated at a drive winding of the transformer while the switching device is on;

an input correction circuit for generating an input correction signal using the current signal which is generated based on the forward voltage, wherein the level of the input correction signal varies in accordance with the level of the DC input voltage; and a maximum on-width generation circuit for limiting the maximum on-width of the switching device, which is the maximum temporal width during which the switching device is on, based on the input correction signal, in accordance with the DC input voltage.

Also in this structure, the forward voltage induced at the drive winding during the on-period of the switching device is converted into a current signal, whose level is in proportion to the DC input voltage. Based on the current signal, an input correction signal can be generated, whose level varies in accordance with the level of the DC input voltage. In this structure, based on the input correction signal, the maximum on-width of the switching device is limited in a manner such that the higher the DC input voltage, the narrower the maximum on-width of the switching device.

Accordingly, Also in this case, it is possible to perform the DC input voltage correction for the overcurrent protection, based on the current signal generated based on the forward voltage. Therefore, external parts (which are necessary in the conventional power supply) can be reduced, thereby reducing the manufacturing cost of the switching power supply and realizing downsizing thereof.

In either switching power supply, the input correction circuit may include:

a device for charging a capacitor to a predetermined level while the switching device is off;

a device for discharging electric charge of the capacitor while the switching device is on, by means of the current signal generated based on the forward voltage; and a device for generating the input correction signal, whose level varies in accordance with the level of the DC input voltage, based on voltage of the capacitor.

In this structure, the input correction signal is generated using the capacitor. More specifically, the capacitor is charged to a predetermined level (e.g., to have a forward voltage) while the switching device is off. Then, while the switching device is on, the electric charge of the capacitor is discharged by means of the current signal (e.g., a negative current signal), which is generated based on the forward voltage at the drive winding. Here, the higher the DC input voltage, the higher the level of the current signal, and accordingly, the lower the voltage level of the capacitor becomes. This voltage of the capacitor is used for generating the input correction signal.

Therefore, it is possible to easily generate the input correction signal in accordance with the DC input voltage, by means of a charging and discharging circuit for the capacitor. Accordingly, external parts (which are necessary in the conventional power supply) can be reduced, thereby reducing the manufacturing cost of the switching power supply and realizing downsizing thereof.

Also in either switching power supply, it is possible that:

the control circuit further comprises a bottom detection circuit for detecting a bottom voltage with respect to free voltage oscillation, which is generated at the drive winding after the switching device is switched off and a specific flyback period is terminated, and for generating an on-trigger signal for switching on the switching device; and the bottom detection circuit has an input terminal for bottom detection, which is commonly connected with an input terminal of the input correction circuit.

Accordingly, in the switching power supply having the bottom detection circuit for detecting a bottom voltage with respect to free voltage oscillation, which is generated at the drive winding during the off-period of the switching device, and for generating an on-trigger signal for switching on the switching device, the input terminal for bottom detection is commonly connected with the input terminal of the input correction circuit. That is, a common input signal (corresponding to the forward voltage at the drive winding) is assigned to both the bottom detection circuit and the input correction circuit.

Accordingly, a common input terminal can be provided to the bottom detection circuit and the input correction circuit, thereby reducing the manufacturing cost of the switching power supply and realizing downsizing thereof.

Preferably, the above current signal generated based on the forward voltage is in proportion to the square of the forward voltage.

The condition with respect to the proportion may be changed in accordance with conditions for use (e.g., the current signal may be in proportion to the forward voltage to the power 5/2 or 3/2). However, when the electric charge of the above-described capacitor is discharged using the current signal which is in proportion to the square of the forward voltage, it is possible to generate the input correction signal which is most accurate in response to a variation in the DC input voltage.

As described above, in the switching power supply of the present invention, the forward voltage generated at the drive winding is detected by means of current conversion, and DC input voltage correction for overcurrent protection is performed based on the detected signal. Therefore, external parts (which are necessary in the conventional power supply) for the DC input voltage correction can be reduced, thereby reducing the manufacturing cost of the switching power supply and realizing downsizing thereof. In addition, the present invention can also contribute to downsizing of the package for the control IC.

DESCRIPTION OF THE PREFERRED EMBODIMENTS

Hereinafter, preferable embodiments for implementing the present invention will be described with reference to the appended figures.

First Embodiment

Figure 1:
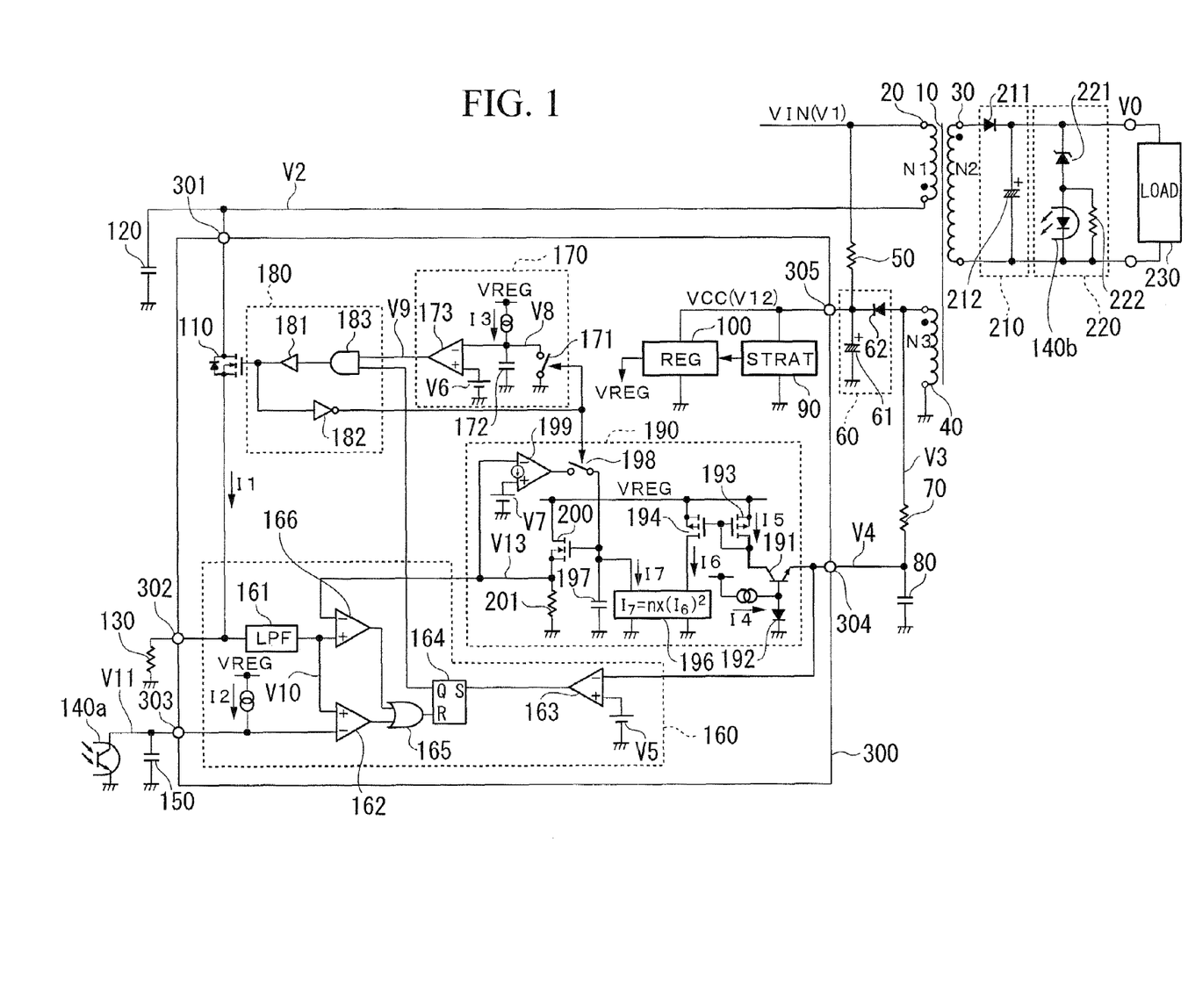
FIG. 1 is a diagram showing the structure of a first embodiment of the switching power supply in accordance with the present invention.

FIG. 1 is a diagram showing the structure of a first embodiment of the switching power supply in accordance with the present invention. Below, the structure of the switching power supply and the operation of each structural element will be explained.

Reference numeral 10 indicates a transformer for transmitting energy to the secondary circuit. Reference numeral 20 indicates a primary winding (the number of turns thereof is N1) of the transformer 10. Reference numeral 30 indicates a secondary winding (the number of turns thereof is N2) of the transformer 10. Reference numeral 40 indicates a drive winding (the number of turns thereof is N3) of the transformer 10. Reference numeral 50 indicates an activation resistor. Reference numeral 60 indicates a rectification smoothing circuit consisting of a diode 62 and smoothing capacitor 61. Reference numeral 70 indicates a bottom control resistor. Reference numeral 80 indicates a bottom control capacitor.

Reference numeral 90 indicates a start circuit ("START") for starting the operation of the switching power supply. Reference numeral 100 indicates a constant voltage source ("REG") for outputting constant voltage VREG. Reference numeral 110 indicates a switching device (here, N-type power MOS FET). Reference numeral 120 indicates a resonance capacitor for setting the amplitude and frequency of free voltage oscillation. Reference numeral 130 indicates a drain-current detection resistor. Reference numerals 140a and 140b respectively indicate a light receiving element and a light emitting element of a photocoupler for transmitting an error signal of output voltage Vo on the secondary side to the primary side. Reference numeral 150 indicates a phase control capacitor. Reference numeral 160 indicates a pseudo-resonance control circuit. Reference numeral 170 indicates a maximum on-width generation circuit. Reference numeral 180 indicates an output-stage circuit. Reference numeral 190 indicates an input correction circuit.

Reference numeral 210 indicates a rectification smoothing circuit for rectifying and smoothing voltage, which is induced at the secondary winding 30 during the off-period of the switching device 110, by using a rectifying diode 211 and a smoothing capacitor 212.

Reference numeral 220 indicates an error amplification circuit which consists of a Zener diode 221, a resistor 222, and the light emitting element 140b of the photocoupler, and feeds back an error signal of the output voltage Vo on the secondary side with respect to a specific reference voltage to the primary side via the light emitting element 140b of the photocoupler.

Reference numeral 230 indicates a load connected to the output terminal of the switching power supply.

The switching device 110, the pseudo-resonance control circuit 160, the maximum on-width generation circuit 170, the output-stage circuit 180, the input correction circuit 190, and the like, are installed in a single control IC 300 (i.e., a semiconductor integrated circuit) for implementing the control circuit of the switching power supply. The control IC has external connection terminals such as a drain terminal 301, an overcurrent detection terminal 302, a feedback terminal 303, a bottom detection terminal 304, and a terminal 305 for an activation circuit.

In the structure shown in FIG. 1, after the switching device 110 is switched off and a specific flyback period is terminated, the waveform of free-oscillation voltage V3 (i.e., forward voltage), generated at the drive winding 40, is shaped via the bottom control resistor 70 and the bottom control capacitor 80, thereby obtaining a voltage signal V4 (i.e., bottom detection terminal voltage).

In the pseudo-resonance control circuit 160, this voltage signal V4 is compared with reference voltage V5 by using a bottom detection comparator 163. When the voltage signal V4 falls below the reference voltage V5, it is determined that the free oscillation has reached its bottom, and an on-trigger signal having the Hi level is output to the set terminal S of an SR flip-flop 164. Accordingly, the output Q of the SR flip-flop 164 is set to the Hi level, so that the switching device 110 is switched on via an AND gate 183 and a drive circuit 181. An inverter 182 is provided for controlling on/off states of switches 171 and 198 in accordance with the on/off state of the switching device 110.

During the on-period of the switching device 10, drain current I1 is converted to a voltage signal by means of the drain-current detection resistor 130, and an overcurrent detection signal V10 is further generated, which has been shaped by a low-pass filter (LPF) 161. In addition, feedback voltage V11 from the secondary side is generated by means of the light receiving element 10a of the photocoupler and constant current I2.

Then the overcurrent detection signal V10 is compared with the feedback voltage V11 from the secondary side by means of a feedback control comparator 162. When the overcurrent detection signal V10 has exceeded the feedback voltage V11, an off-trigger signal of Hi level is output to the reset terminal R of the SR flip-flop 164, thereby switching off the switching device 110 and thus controlling the output voltage Vo on the secondary side at a constant level.

Below, operations of the overcurrent detection comparator 166 and the input correction circuit 190 will be explained.

When the overcurrent detection signal V10 has exceeded reference voltage V13 (i.e., input correction voltage), the overcurrent detection comparator 166 determines an overcurrent state, and outputs a Hi-level signal to the reset terminal R of the SR flip-flop 164, so as to forcibly switch off the switching device 110 and protect the relevant system.

During the on-period of the switching device 110, a pulse-formed negative voltage (i.e., forward voltage) in proportion to the DC input voltage V1 is generated at the drive winding 40. This forward voltage is subjected to current conversion using the bottom control resistor 70. The input correction circuit 190 is provided for detecting a signal obtained by the current conversion, and generating the input correction voltage V13 based on this signal. This input correction voltage V13 is output as the reference voltage (i.e., input correction voltage) to the overcurrent detection comparator 166.

The base of an NPN transistor 191 is connected to the anode of a diode 192, which is biased using constant current I4. The NPN transistor 191 functions as a clamping device for preventing the voltage V4 at the bottom detection terminal 304 from obtaining a negative electric potential. P-type MOS FETs 193 and 194 form a mirror circuit for generating current I6 using input current I5 which is in proportion to the forward voltage generated at the drive winding 40 during the on-period of the switching device 110. An operation circuit 196 is provided for generating discharge current I7 of a capacitor 197, which is in proportion to the square of the current I6.

When the switch 198 is closed during the off-period of the switching device 110, the capacitor 197 is charged to have the same electric potential as the reference voltage V7 of an operational amplifier (op amp) 199. In contrast, when the switch 198 is opened during the on-period of the switching device 110, the capacitor 197 discharges electric charge as the discharge current I7 which is in proportion to the square of the forward voltage generated at the drive winding 40. Accordingly, the capacitor 197 generates a voltage gradient signal in response to the DC input voltage V1.

An N-type MOS FET 200 and a resistor 201 form an impedance conversion circuit for subjecting the voltage gradient signal of the capacitor 197 to impedance conversion, and outputting the input correction voltage V13 to a feedback input terminal of the operational amplifier 199 and a reference input terminal of the overcurrent detection comparator 166.

Below, the operation of the input correction circuit 190 in the switching power supply in FIG. 1 will be explained in detail, with reference to a timing chart in FIG. 2.

Figure 2:
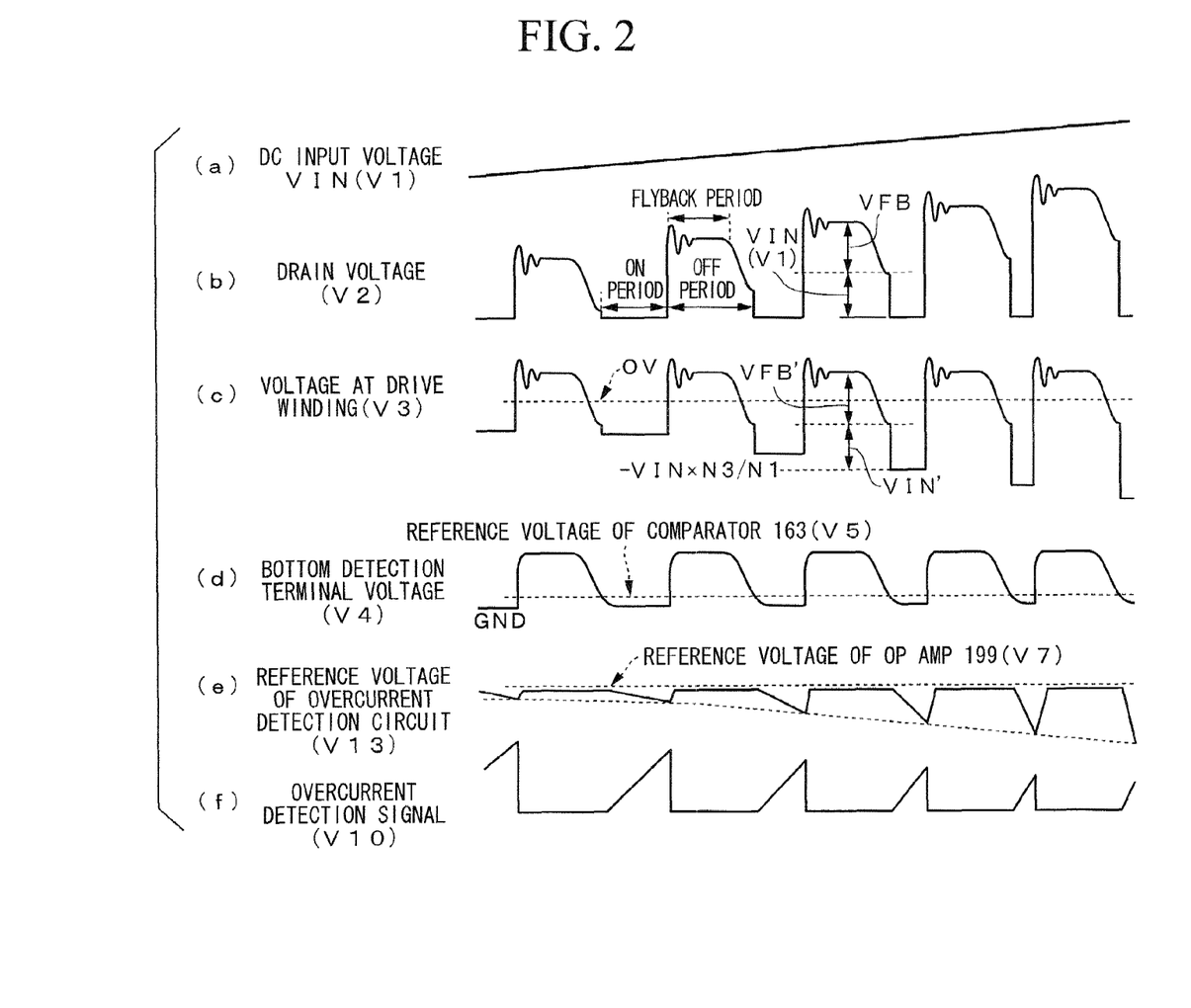
FIG. 2 is a timing chart for explaining the operation of the first embodiment.

In FIG. 2, part (a) shows the waveform of the DC input voltage VIN (i.e., V1) whose level increases linearly as time passes.

Part (b) indicates the waveform of the drain voltage V2 of the switching device 110. During the on-period of the switching device 110, the drain voltage V2 is substantially 0 V, and during the off-period (i.e., flyback period) thereof, a waveform in which flyback voltage VFB superimposes on the DC input voltage VIN (i.e., V1).

Part (c) indicates the waveform of the voltage V3 at the drive winding 40. During the on-period of the switching device 110, voltage VIN' (forward voltage) in proportion to the winding ratio (of the number (of turns) N3 of the drive winding 40 to the number N1 of the primary winding 20) with respect to the DC input voltage V1 is generated at the drive winding 40 (i.e., VIN'=−VIN×N3/N1).

Part (d) indicates the waveform of the bottom detection terminal voltage V4 and the reference voltage V5 of the bottom detection comparator 163. During the on-period of the switching device 110, the bottom detection terminal voltage V4 is clamped at substantially 0 V by the NPN transistor 191.

Part (e) indicates the waveform of the reference voltage V13 (i.e., input correction voltage) for the overcurrent detection circuit (i.e., the overcurrent detection comparator 166) and the reference voltage V7 of the operational amplifier 199.

Part (f) indicates the waveform of the overcurrent detection signal V10.

As described above, during the on-period of the switching device 110, the forward voltage V3 in proportion to the DC input voltage V1 is generated at the drive winding 40 (see part (c) in FIG. 2).

In accordance with the forward voltage V3, the current (signal) I5 flows through the bottom control resistor 70 from the constant voltage source ("REG") 100 via the P-type MOS FET 193 and the NPN transistor 191. In this process, the voltage V4 at the bottom detection terminal 304 is clamped at substantially 0 V by the NPN transistor 191 (see part (d) in FIG. 2). Thus, the forward voltage V3 generated at the drive winding 40 is converted via the bottom control resistor 70 into the current signal I5, which flows through the bottom detection terminal 304.

The current signal I5 is a few hundred microamperes, which is relatively large as a current value for a semiconductor integrated circuit, and thus is subjected to current division by means of the current mirror circuit consisting of the P-type MOS FETs 193 and 194, thereby generating the current (signal) I7 via the operation circuit 196, where I7 is in a few microampere range, which can be more easily handled with respect to a semiconductor integrated circuit.

As shown in part (e) in FIG. 2, during the off-period of the switching device 110, the capacitor 197 is instantly charged to the maximum voltage which is determined by the reference voltage V7, and during the on-period thereof, the capacitor 197 discharges electric charge as the current signal I7. The discharge (voltage) gradient signal due to the discharge process is subjected to impedance conversion using the impedance conversion circuit consisting of the N-type MOS FET 200 and the resistor 201, thereby obtaining the reference voltage V13 (i.e., the input correction voltage), which is input into the reference terminal (i.e., negative input terminal) of the overcurrent detection comparator 166.

The higher the DC input voltage V1, the steeper the gradient of the reference voltage V13 (the input correction voltage) and thus the larger the voltage drop thereof. Therefore, as shown in part (f) in FIG. 2, control is performed in a manner such that the higher the DC input voltage V1, the lower the peak value of the overcurrent detection signal V10 which is in proportion to the drain current I1 of the switching device 110. Accordingly, the higher the DC input voltage VIN (i.e., V1), the more largely the maximum value of the overcurrent detection signal V10 can be limited, thereby resulting in overcurrent protection with less input-dependency.

The accuracy of the overcurrent protection is substantially determined by the capacitor 197 and a coefficient "n" of the operation circuit 196 in the input correction circuit 190 when ignoring dispersion with respect to the bottom control resistor 70 which is an external part. The dispersion range with respect to capacitors used in the semiconductor integrated circuit is approximately ±10 to ±15%. Such capacitors basically have zero-temperature characteristics, and have the highest accuracy as semiconductor passive elements. When also performing appropriate trimming of the coefficient "n" of the operation circuit, it is possible to execute overcurrent protection which employs a relatively simple structure, has high accuracy, and can be controlled by only using the external bottom control resistor 70.

Second Embodiment

A second embodiment of the present invention will be explained.

Figure 3:
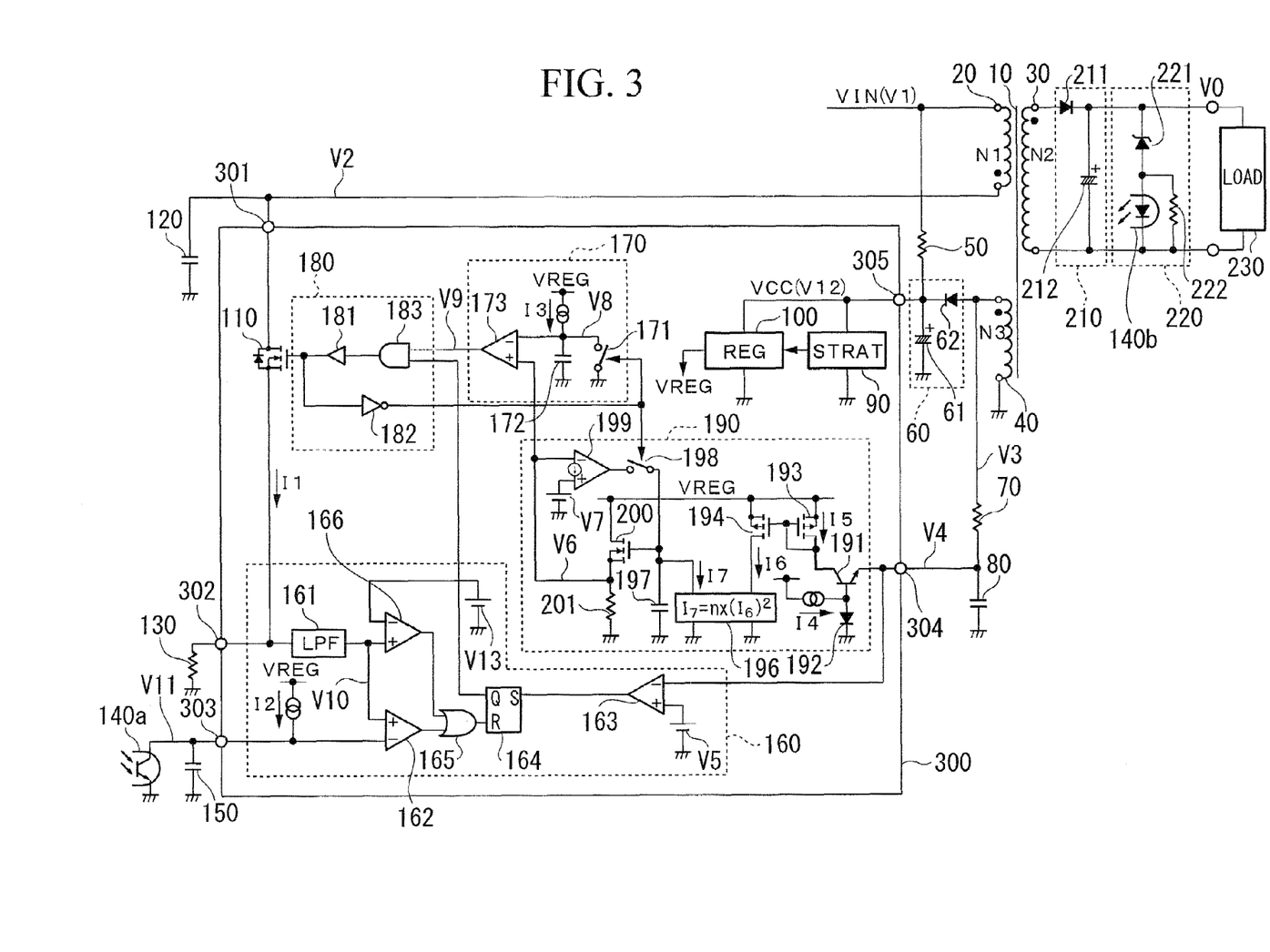
FIG. 3 is a diagram showing the structure of a second embodiment of the switching power supply in accordance with the present invention.

FIG. 3 is a diagram showing the structure of the second embodiment of the switching power supply in accordance with the present invention. Below, the structure of the switching power supply and the operation of each structural element in FIG. 3 will be explained. In FIG. 3, parts substantially identical to those in FIG. 1 are given identical reference numerals, and explanations thereof are omitted or simplified.

Here, the operations of the maximum on-width generation circuit 170 and the input correction circuit 190 will be explained.

The maximum on-width generation circuit 170 is provided for preventing the on-width of the switching device 110 from being excessively widened when the input voltage is low or the power is switched off, and also for restricting the on-width of the switching device 110 in an overload state, thereby preventing overcurrent from flowing.

When the switch 171 is opened during the on-period of the switching device 110, a capacitor 172 is charged using constant current I3, thereby obtaining capacitor voltage V8. This voltage V8 is compared with reference voltage V6 by a comparator 173. When the voltage V8 is higher than the reference voltage V6, the comparator 173 outputs a Lo (i.e., low)-level signal, so as to forcibly switch off the switching device 110.

During the on-period of the switching device 110, pulse-formed negative voltage (i.e., forward voltage) in proportion to the DC input voltage V1 is generated at the drive winding 40. This forward voltage is subjected to current conversion using the bottom control resistor 70. The input correction circuit 190 is provided for detecting a signal obtained by the current conversion, and generating input correction voltage V6 based on this signal. This input correction voltage V6 is output as the reference voltage to the comparator 173.

An N-type MOS FET 200 and a resistor 201 form an impedance conversion circuit for subjecting the voltage gradient signal of the capacitor 197 to impedance conversion, and outputting the reference voltage V6 to the feedback input terminal of the operational amplifier 199 and also to the maximum on-width generation circuit 170.

Below, the operation of the input correction circuit 190 in the switching power supply in FIG. 3 will be explained in detail, with reference to a timing chart in FIG. 4.

Figure 4:
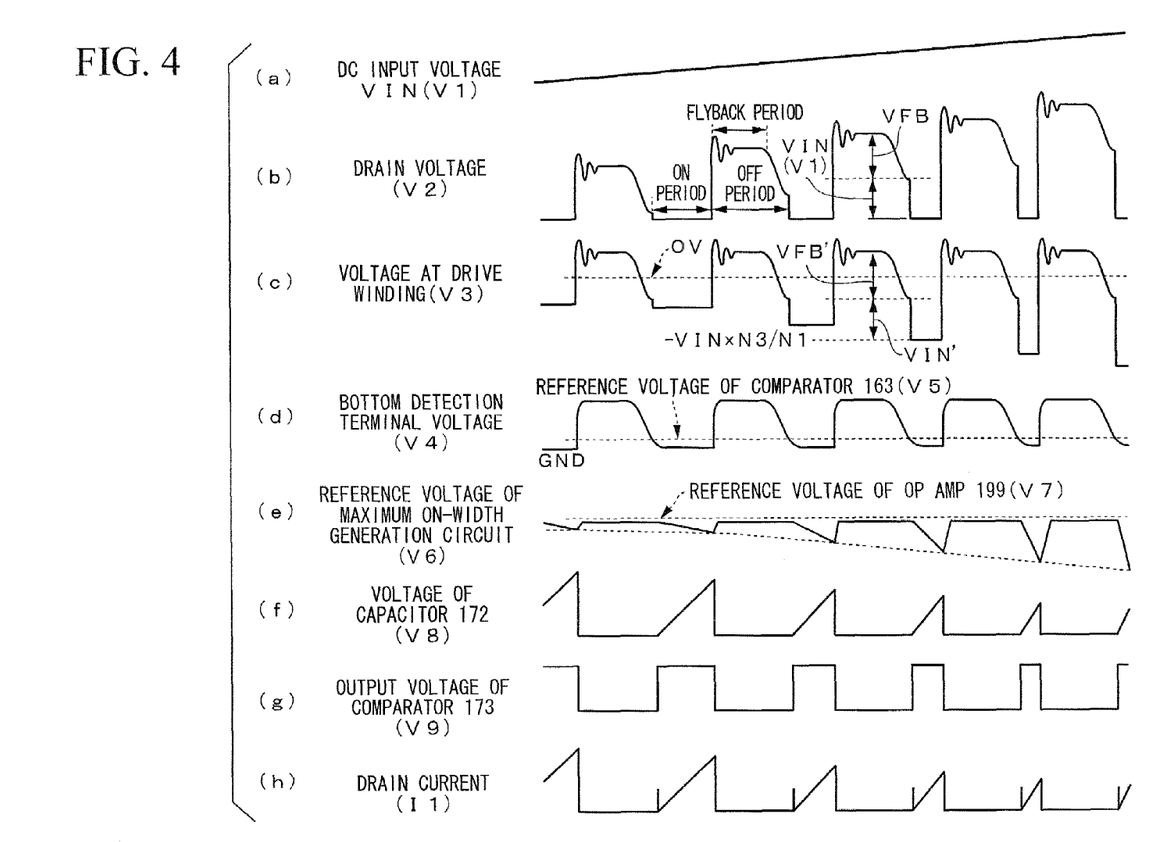
FIG. 4 is a timing chart for explaining the operation of the second embodiment.

In FIG. 4, parts (a) to (d) are respectively identical to parts (a) to (d) in FIG. 2, and explanation thereof are omitted.

Part (e) indicates the waveform of the reference voltage V6 (i.e., input correction voltage), which is input into the comparator 173 of the maximum on-width generation circuit 170, and the reference voltage V7 of the operational amplifier 199.

Part (f) indicates the waveform of the voltage V8 of the capacitor 172 in the maximum on-width generation circuit 170.

Part (g) indicates the waveform of voltage V9 output from the comparator 173.

Part (h) indicates the waveform of the drain current I1.

With reference to FIG. 4, during the on-period of the switching device 110, the forward voltage V3 in proportion to the winding ratio with respect to the DC input voltage is generated at the drive winding 40 (see part (c)).

On the other hand, during the on-period of the switching device 110, the voltage V4 at the bottom detection terminal 304 is clamped at substantially 0 V by the NPN transistor 191 (see part (d) in FIG. 4). Thus, the forward voltage V3 is converted via the bottom control resistor 70 into the current signal I5, which is input into the bottom detection terminal 304.

The current signal I5 is a few hundred microamperes, which is relatively large as a current value for a semiconductor integrated circuit, and thus is subjected to current division by means of the current mirror circuit consisting of the P-type MOS FETs 193 and 194, thereby generating the current (signal) I7 via the operation circuit 196, where I7 is in a few microampere range, which can be more easily handled with respect to a semiconductor integrated circuit.

As shown in part (e) in FIG. 4, during the off-period of the switching device 110, the capacitor 197 is instantly charged to the maximum voltage which is determined by the reference voltage V7, and during the on-period thereof, the capacitor 197 discharges electric charge as the current signal I7. The discharge (voltage) gradient signal due to the discharge process is subjected to impedance conversion using the impedance conversion circuit consisting of the N-type MOS FET 200 and the resistor 201, thereby obtaining the reference voltage V6, which is input into the reference terminal (i.e., positive input terminal) of the comparator 173 in the maximum on-width generation circuit 170.

The higher the DC input voltage V1, the steeper the gradient of the reference voltage V6 for the comparator 173 and thus the larger the voltage drop within a specific time period. Therefore, control is performed so as to narrow the maximum on-width generated by the maximum on-width generation circuit 170. That is, as shown in part (g) in FIG. 4, the higher the DC input voltage VIN (i.e., V1), the narrower the on-width which is limited by the maximum on-width generation circuit 170, thereby resulting in overcurrent protection having small input-dependency.

As described above, the accuracy of the overcurrent protection is substantially determined by the capacitor 197 and a coefficient "n" of the operation circuit 196 in the input correction circuit 190 when ignoring dispersion with respect to the bottom control resistor 70 which is an external part. The dispersion range with respect to capacitors used in the semiconductor integrated circuit is approximately ±10 to ±15%. Such capacitors basically have zero-temperature characteristics, and have the highest accuracy as semiconductor passive elements. When also performing appropriate trimming of the coefficient "n" of the operation circuit, it is possible to execute overcurrent protection which employs a relatively simple structure, has high accuracy, and can be controlled by only using the external bottom control resistor 70.

In addition, the discharge current I7 of the capacitor 197, which is generated by the operation circuit 196 in the input correction circuit 190 may be (i) in proportion to the current I6 to the power 5/2 so that the variation in the input (voltage) correction signal is larger in comparison with the variation in the input voltage, or (ii) in proportion to the current I6 to the power 3/2 so that the variation in the input correction signal is smaller in comparison with the variation in the input voltage. That is, when the input voltage varies, the power level may be controlled in accordance with desired output current. When the discharge current I7 of the capacitor 197 is in proportion to the square of current I6, it is possible to perform overcurrent protection which is less dependent on the variation in the input voltage.

As explained above, in the switching power supply of the present invention, the forward voltage generated at the drive winding is detected by means of current conversion, and DC input voltage correction for overcurrent protection can be performed using the discharge waveform of a capacitor in the input correction circuit, thereby obtaining high detection accuracy and also reducing external parts, which are necessary in conventional DC input voltage correction for overcurrent protection. Therefore, it is possible to reduce the manufacturing cost of the switching power supply and realize downsizing thereof. In addition, the bottom detection terminal can also be used as a terminal for the pseudo-resonance control. Therefore, the present invention can contribute to downsizing of the package for the control IC.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

INDUSTRIAL APPLICABILITY

In accordance with the present invention, external parts for performing the DC input voltage correction for overcurrent protection can be reduced, and manufacturing-cost reduction and downsizing of the switching power supply can be realized. Therefore, the present invention can be effectively applied to the switching power supply such as a DC-DC converter.

What is claimed is:

1. A switching power supply comprising:
    a switching device connected via a primary winding of a transformer to DC input voltage;
    a rectification smoothing circuit for rectifying voltage which is induced at a secondary winding of the transformer, and outputting an output signal; and
    a control circuit which controls on/off states of the switching device and includes:
        a current signal detection circuit for detecting a current signal generated based on a forward voltage which is generated at a drive winding of the transformer while the switching device is on;
        an input correction circuit for generating an input correction signal using the current signal which is generated based on the forward voltage, wherein the level of the input correction signal varies in accordance with the level of the DC input voltage;
        a switching device current detection circuit for detecting a signal of current which flows through the switching device; and
        an overcurrent detection circuit for comparing the input correction signal with the signal of the current flowing through the switching device, and limiting the maximum value of the current flowing through the switching device in accordance with the DC input voltage.

2. A switching power supply comprising:
    a switching device connected via a primary winding of a transformer to DC input voltage;
    a rectification smoothing circuit for rectifying voltage which is induced at a secondary winding of the transformer, and outputting an output signal; and
    a control circuit which controls on/off states of the switching device and includes:
        a current signal detection circuit for detecting a current signal generated based on a forward voltage which is generated at a drive winding of the transformer while the switching device is on;
        an input correction circuit for generating an input correction signal using the current signal which is generated based on the forward voltage, wherein the level of the input correction signal varies in accordance with the level of the DC input voltage; and
        a maximum on-width generation circuit for limiting the maximum on-width of the switching device, which is the maximum temporal width during which the switching device is on, based on the input correction signal, in accordance with the DC input voltage.

3. A switching power supply in accordance with claim 1, wherein the input correction circuit includes:
    a device for charging a capacitor to a predetermined level while the switching device is off;
    a device for discharging electric charge of the capacitor while the switching device is on, by means of the current signal generated based on the forward voltage; and
    a device for generating the input correction signal, whose level varies in accordance with the level of the DC input voltage, based on voltage of the capacitor.

4. A switching power supply in accordance with claim 2, wherein the input correction circuit includes:
    a device for charging a capacitor to a predetermined level while the switching device is off,
    a device for discharging electric charge of the capacitor while the switching device is on, by means of the current signal generated based on the forward voltage; and
    a device for generating the input correction signal, whose level varies in accordance with the level of the DC input voltage, based on voltage of the capacitor.

5. A switching power supply in accordance with claim 3, wherein the current signal generated based on the forward voltage is in proportion to the square of the forward voltage.

6. A switching power supply in accordance with claim 4, wherein the current signal generated based on the forward voltage is in proportion to the square of the forward voltage.

7. A switching power supply in accordance with claim 1, wherein:
    the control circuit further comprises a bottom detection circuit for detecting a bottom voltage with respect to free voltage oscillation, which is generated at the drive winding after the switching device is switched off and a specific flyback period is terminated, and for generating an on-trigger signal for switching on the switching device; and
    the bottom detection circuit has an input terminal for bottom detection, which is commonly connected with an input terminal of the input correction circuit.

8. A switching power supply in accordance with claim 2, wherein:
    the control circuit further comprises a bottom detection circuit for detecting a bottom voltage with respect to free voltage oscillation, which is generated at the drive winding after the switching device is switched off and a specific flyback period is terminated, and for generating an on-trigger signal for switching on the switching device; and
    the bottom detection circuit has an input terminal for bottom detection, which is commonly connected with an input terminal of the input correction circuit.

* * * * *